(12) United States Patent
Lochocki, Jr. et al.

(10) Patent No.: US 9,869,259 B1
(45) Date of Patent: Jan. 16, 2018

(54) SYSTEM AND METHOD FOR VEHICLE PROPULSION SYSTEM CONTROL

(71) Applicant: GM GLOBAL TECHNOLOGY OPERATIONS LLC, Detroit, MI (US)

(72) Inventors: Ronald F. Lochocki, Jr., Ypsilanti, MI (US); Ryan Z. Goode, Howell, MI (US); Mark A. Schang, Milford, MI (US); Jonathan Kish, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/285,976

(22) Filed: Oct. 5, 2016

(51) Int. Cl.
*F02D 41/02* (2006.01)
*F16H 63/50* (2006.01)

(52) U.S. Cl.
CPC ....... *F02D 41/022* (2013.01); *F02D 41/0225* (2013.01); *F16H 63/50* (2013.01)

(58) Field of Classification Search
None
See application file for complete search history.

(56) References Cited

U.S. PATENT DOCUMENTS

| 5,476,425 | A  | * | 12/1995 | Shiraishi | B60W 10/06 477/109 |
| 6,434,466 | B1 | * | 8/2002  | Robichaux | B60W 10/06 477/107 |
| 6,449,548 | B1 | * | 9/2002  | Jain      | B60W 10/06 475/149 |
| 8,137,241 | B2 |   | 3/2012  | Bai       |                    |
| 8,504,265 | B2 |   | 8/2013  | Baur et al. |                  |
| 8,540,606 | B2 | * | 9/2013  | Livshiz   | B60W 10/06 477/181 |
| 9,057,333 | B2 |   | 6/2015  | Livshiz et al. |               |
| 9,090,245 | B2 |   | 7/2015  | Livshiz et al. |               |

FOREIGN PATENT DOCUMENTS

EP         1201904 A2 *  5/2002  ............. F02D 41/38

* cited by examiner

*Primary Examiner* — Dirk Wright
(74) *Attorney, Agent, or Firm* — General Motors LLC

(57) ABSTRACT

A propulsion system controller for a vehicle that includes a prime mover operable for generating an input torque on an input shaft, and a transmission connected to the prime mover that is configured to receive the input torque from the input shaft and produce an output torque on an output shaft. The controller is programmed to generate a torque phase ratio, and submit a torque request to the prime mover that is based upon a desired output torque divided by the torque phase ratio.

20 Claims, 4 Drawing Sheets

SYSTEM AND METHOD FOR VEHICLE PROPULSION SYSTEM CONTROL

FIELD

The present disclosure relates to a system and method that controls a vehicle propulsion system.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Motorized vehicles include a prime mover that generates input torque. The received input torque is transmitted across an input shaft to a transmission. The transmission receives the input torque and transfers it to an output torque on an output shaft. The output torque is a multiple of the input torque and a gear ratio of the transmission.

Typically, the prime mover is controlled such that it provides a desired or commanded amount of input torque. A controller generally determines the desired amount of input torque to request or command from the prime mover by determining a desired amount of axle torque or other output torque and dividing that desired amount of axle torque by the gear ratio of the transmission. The gear ratio is typically calculated in a processor based upon signals from a transmission input shaft speed sensor and a transmission output shaft speed sensor.

This process provides a value for the gear ratio which is a lagging indicator of the actual change in mechanical advantage provided by the transmission as an on-coming element takes over from the off-going element. Since the prime mover is being controlled based upon this lagging indicator additional compensation, such as, for example, workload intensive, calibration table creation processes, is required to anticipate the change in mechanical advantage prior to the measurements being taken to calculate the gear ratio. When such additional compensation is not accurate, the axle torque transient before, during, or after the shift may not be imperceptibly smooth. A goal is to provide a smooth shift that is imperceptible to the occupants of the vehicle.

Additionally, during a shift, the request or command sent to the engine controller may be subject to torque management which may cause the engine controller to follow a torque management profile. The engine controller follows a torque management profile in an attempt to avoid torque transients. The torque management profiles were the result of workload intensive calibration efforts in an attempt to compensate or minimize the torque transients.

SUMMARY

In an exemplary aspect, a vehicle includes a prime mover operable for generating an input torque on an input shaft, a transmission connected to the prime mover that is configured to receive the input torque from the input shaft and produce an output torque on an output shaft, and a controller in communication with the transmission and the prime mover. The controller is programmed to generate a torque phase ratio and submit a torque request to the prime mover that is based upon a desired output torque divided by the torque phase ratio.

In another exemplary aspect, the torque phase ratio is determined based upon an attained gear ratio at the start of a torque phase and a commanded gear ratio at the end of the torque phase In another exemplary aspect, the torque phase ratio follows a linear projection between the attained gear ratio at the start of the torque phase and the commanded gear ratio at the end of the torque phase.

In another exemplary aspect, the torque phase starts when an on-coming clutch fills.

In another exemplary aspect, the torque phase ends when an on-coming clutch becomes effective to carry a desired torque and have an effect upon engine speed.

In another exemplary aspect, the torque phase ends when an off-going clutch releases.

In another exemplary aspect, the transmission provides clutch capacity feedback and the torque phase ratio is generated based upon the clutch capacity feedback.

In another exemplary aspect, the torque phase ratio is further determined based upon an attained gear ratio at the start of a torque phase and a commanded gear ratio at the end of a torque phase.

In this manner, adverse transients may be minimized and/or avoided because the requests for torque submitted to the prime mover more accurately and more timely reflect the actual ratio change rather than being delayed or otherwise requiring artificial, expensive, time-consuming, complicated calibration efforts that are not based upon the actual ratio change. Thus, with the present invention ratio changes can take place such that the torque actually being applied to the axle is imperceptible to the vehicle occupants.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
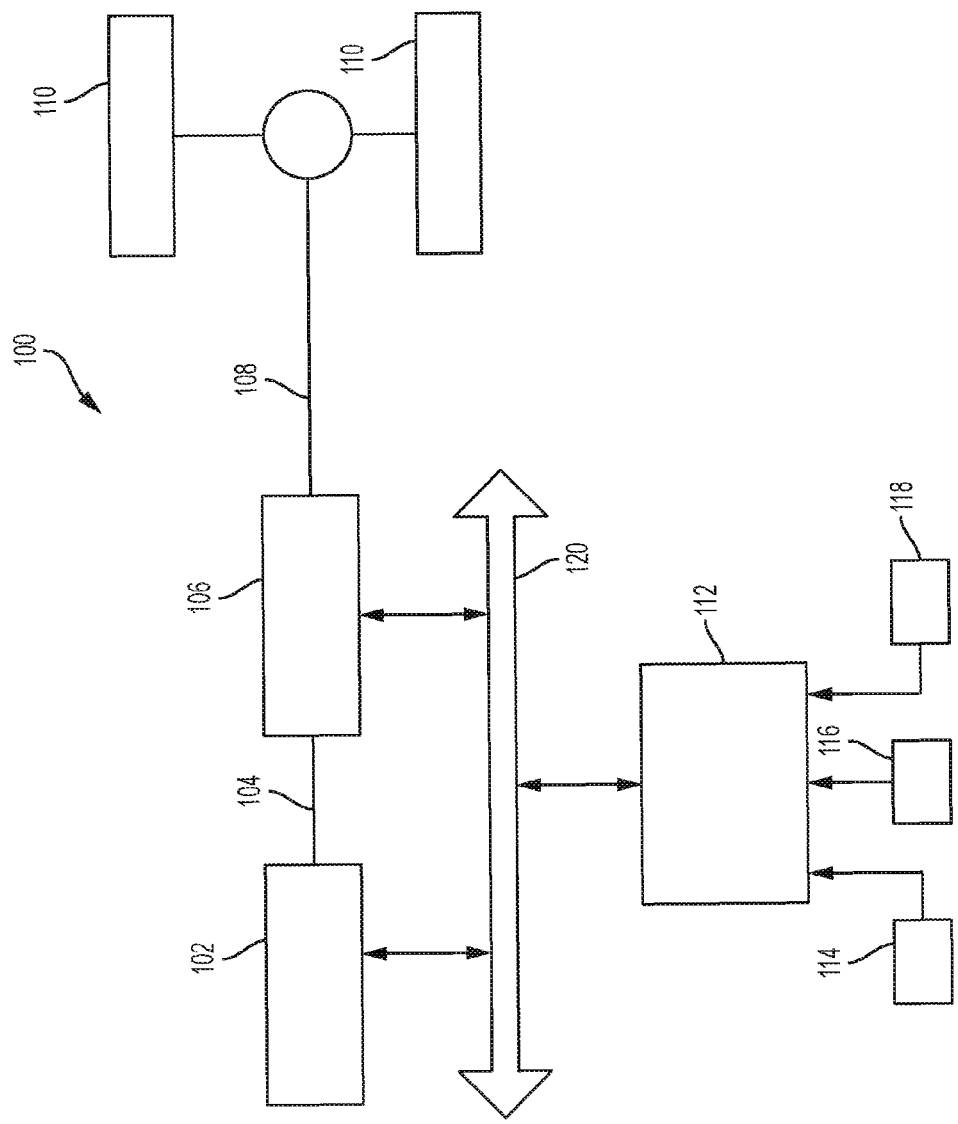
FIG. 1 is a schematic illustration of an exemplary vehicle having a transmission and controller programmed to execute a vehicle propulsion system control method.

Referring to FIG. 1, an exemplary vehicle 100 is schematically depicted with a prime mover 102, e.g., an engine, an electric motor, and/or the like. The prime mover 102 provides torque to an input shaft 104 which is connected to a transmission 106. The transmission converts the input torque from the input shaft 104 to an output torque on an output shaft 108 based upon a gear ratio of the transmission 106. The output shaft 108 may form a portion of or connect to a drive axle that powers drive wheels 110 which propel the vehicle 100. The desired input torque on the input shaft 104 is governed according to the following equation:

$$T_e = T_{axl}/\text{Ratio} \tag{1}$$

Where: $T_e$ is the desired input torque on the input shaft (also known as engine torque), $T_{axl}$ is the desired output torque on the output shaft (also may be known as the axle torque), and ratio represents all of the gear ratios between the engine 102 and the drive wheels 110. That ratio may include multiple components depending upon the specific powertrain configuration. For example, a powertrain may include a ratio for each of a torque converter, a transfer case, a final drive, a chain drive, and/or the like. In general, the portion of the Ratio corresponding to any one or all of these components do not vary or vary very little. By contrast, the largest variance on the value of that ratio depends upon the portion which represents the transmission gear ratio (TGR). The transmission 106 may be of any type, for example, a clutch to clutch, a dual clutch, a constantly variable transmission or the like without limitation. The transmission 106 serves to convert the speed and torque received from the input shaft 104 to a different speed and torque provided to the output shaft 108.

The vehicle 100 further includes a controller 112 that is programmed to execute a method 400 for vehicle propulsion system control as is explained in more detail below and in reference to FIG. 4. The controller 112 is in communication with a user interface such as, for example, a pedal position sensor 114, and also communicates with a transmission input speed sensor 116 and a transmission output speed sensor 118. Although FIG. 1 shows controller 112 as a single component, the controller 112 may include any number of separate modules and/or components, such as an engine control module and/or a transmission control module, which are located together or distributed across a local network and which may communicate with each other using a controller area network bus (which may also be known as a CAN bus) 120, without limitation.

Figure 2:
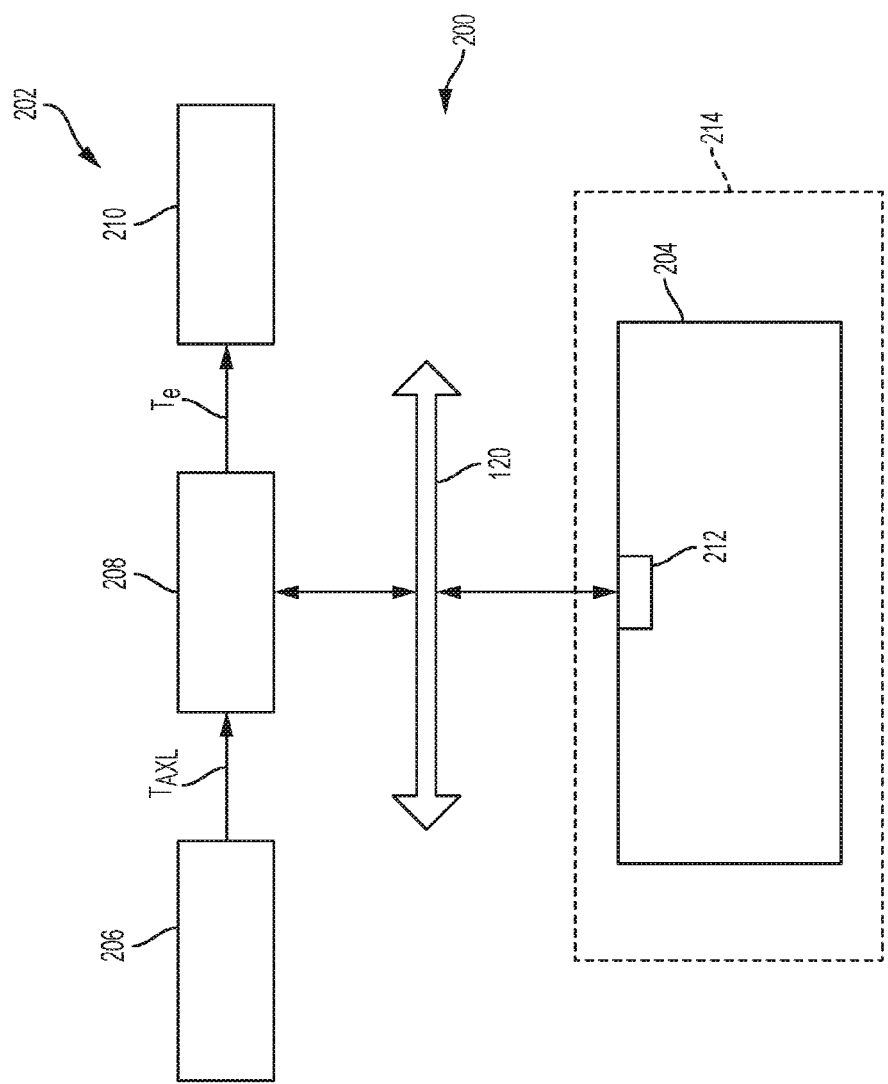
FIG. 2 is a schematic illustration of an exemplary command structure for a vehicle propulsion system.

Referring now to FIG. 2, a schematic of an exemplary vehicle propulsion control system 200 is illustrated. The components in the system 200 correspond to modules or subroutines programmed into the controller 112 to execute a vehicle propulsion control method. The vehicle propulsion control system 200 includes an engine torque backbone 202 and a transmission power transfer backbone 204 that communicate with each other via the controller area network bus 120. The engine torque backbone 202 provides a command structure for the engine control system. The engine torque backbone 202 includes a torque request module 206, an axle torque arbitration module 208, and a prime mover torque controller 210. The torque request module 206 may communicate with the user interface 114, such as a pedal position sensor, the transmission output shaft sensor 118, and the like without limitation. The torque request module 206 generates an axle torque request based upon a request for axle torque from a user interface, such as the pedal position sensor, and the like. The axle torque arbitration module 208 receives the axle torque request from the torque request module 206 and generates an arbitrated prime mover torque request. The axle torque arbitration module 208 may determine the arbitrated prime mover torque request based upon the axle torque request received from the torque request module 206 and torque requests received from other components and/or modules, such as, for example, a traction control module which may request a modification of the torque based upon measured slip of the drive wheels 110, a transmission control module which may request a modification of the torque based upon the torque capacity of the transmission 106, or the like without limitation.

Further, the axle torque arbitration module 208 may receive a torque phase ratio, TPR 212, from the transmission power transfer backbone 204 via the controller area network 120 and may output an arbitrated prime mover torque request that is calculated based upon equation (1) provided above and using the TPR in lieu of the transmission gear ratio TGR. In other words, the arbitrated prime mover torque request may be calculated by dividing a desired output torque with the torque phase ratio. To avoid adverse transients and anticipate the change in mechanical ratio provided by the transmission, the torque phase ratio TPR 212 that is used by the axle torque arbitration module 208 is received from the transmission power transmission backbone 204 via the controller area network 120. The torque phase ratio TPR 212 has been generated by the transmission power transfer backbone 204 to enable the prime mover to provide an input torque that properly anticipates the change in mechanical ratio which may result in a substantially flat or otherwise desirable axle torque output from the transmission.

The axle torque arbitration module 208 provides the arbitrated prime mover torque request to the prime mover torque control 210. The prime mover torque control 210 operates to control the prime mover 102 in a manner which will result in the prime mover providing an input torque on the input shaft 104 which corresponds to the arbitrated prime mover torque request received from the axle torque arbitration module 208. For example, the prime mover torque control 210 for an internal combustion engine may include an engine control module that converts the torque request into commands to the engine that control spark, fuel, variable valve timing, electronic throttle control and the like without limitation to cause the engine to output the requested torque.

Figure 3:
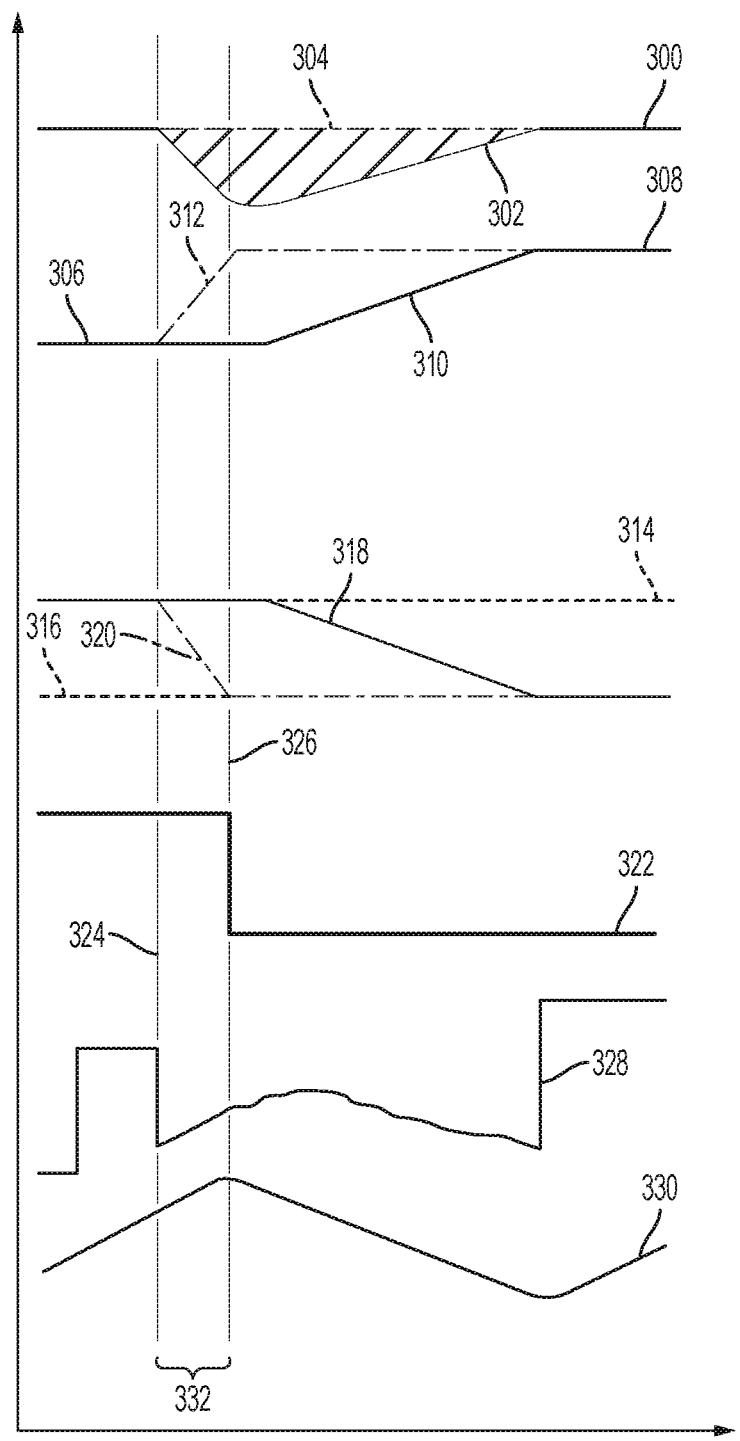
FIG. 3 illustrates simulated vehicle propulsion system control in accordance with an exemplary embodiment of the present invention.

FIG. 3 illustrates a simulated vehicle propulsion system control in accordance with an exemplary embodiment of the present invention. During an upshift, engine speed 330 will rise during a torque phase 332 of the upshift and will start to drop when the on-coming clutch, starts to become effective to carry a desired torque which is sufficient to have an effect on the engine speed.

Conventionally, an engine torque backbone 202 will generate a torque request to submit to a prime mover controller 210 that is based upon dividing a desired axle torque by a gear ratio. As is illustrated in FIG. 3, that gear ratio value 318 is based upon actual measured values generated by the transmission input speed sensor 116 and the transmission output speed sensor 118. Using these values a measured gear ratio value 318 is determined based upon the value from the transmission input sensor 116 divided by the value from the transmission output speed sensor 118. That measured gear ratio value 318 transitions from an attained gear ratio 314 to a lower commanded gear ratio 316 in an upshift. As can be clearly seen, that measured gear ratio value 318 does not start to move from the attained gear ratio 314 until after the torque phase has completed and after the actual ratio change has completed when the offgoing element 322 has released at time 326. Therefore, there is a delay between the actual ratio change and the change in measured gear ratio 318.

As a result of this delay between the change in measured gear ratio value 318 in comparison to the actual ratio change, the desired input torque 310 that is requested and provided by the prime mover is delayed. The prime mover also may include inherent delays or response lag. For example, when a shift is commanded a prime mover controller may serve a function called torque management. Torque management of a combustion engine may be done by, for example, pulling spark, while maintaining the flow of air and fuel. However, in order to perform torque management the controller relies upon the measured gear ratio value calculated by the engine torque backbone. As explained above that measured gear ratio value is delayed. Further, the prime mover itself may have an inherent delay or lag. For example, a combustion engine relies upon air flowing through a manifold. There is an inherent transport lag in the air mass entering the engine which results in a delay in response despite substantially immediate changes in commanded spark. Therefore, as illustrated in FIG. 3, the input torque 310 that is requested from and actually received the prime mover is delayed. This results in the axle torque 302 having a "torque hole" that is illustrated in FIG. 3 as a cross-hatched area between an ideal or desired input torque and the actual torque received from the prime mover. The axle torque 302 is lower than the desired axle torque 300 thereby resulting in the "torque hole." Ideally, the axle torque 300 would remain completely flat or follow another desired torque profile. However, because of the lag inherent in the conventional system the axle torque 302 does not follow the desired profile 300.

In stark contrast, an exemplary embodiment of the present invention generates a torque phase ratio, TPR 320 value that is substituted for the transmission gear ratio, TGR 318. In this manner, the torque phase ratio, TPR 320 enables the engine controller to command the prime mover to provide an input torque 312 that avoids the "torque hole" and results in an axle torque 304 which follows a desired axle torque profile 300. For example, the axle torque 304 remains flat and, thus, the adverse transients are avoided and the shift is imperceptible to vehicle occupants.

The torque phase ratio 320 may be determined based upon a transition between the attained ratio 314 at time 324 where, for example, the on-coming clutch 328 engaged, and the commanded ratio 316 at time 326, where the off-going clutch 322 released. The torque phase ratio 320 shown in FIG. 3 transitions linearly between those two points. However, it is understood that any profile for transition is possible, without limitation between those two points and still practice the present invention.

Figure 4:
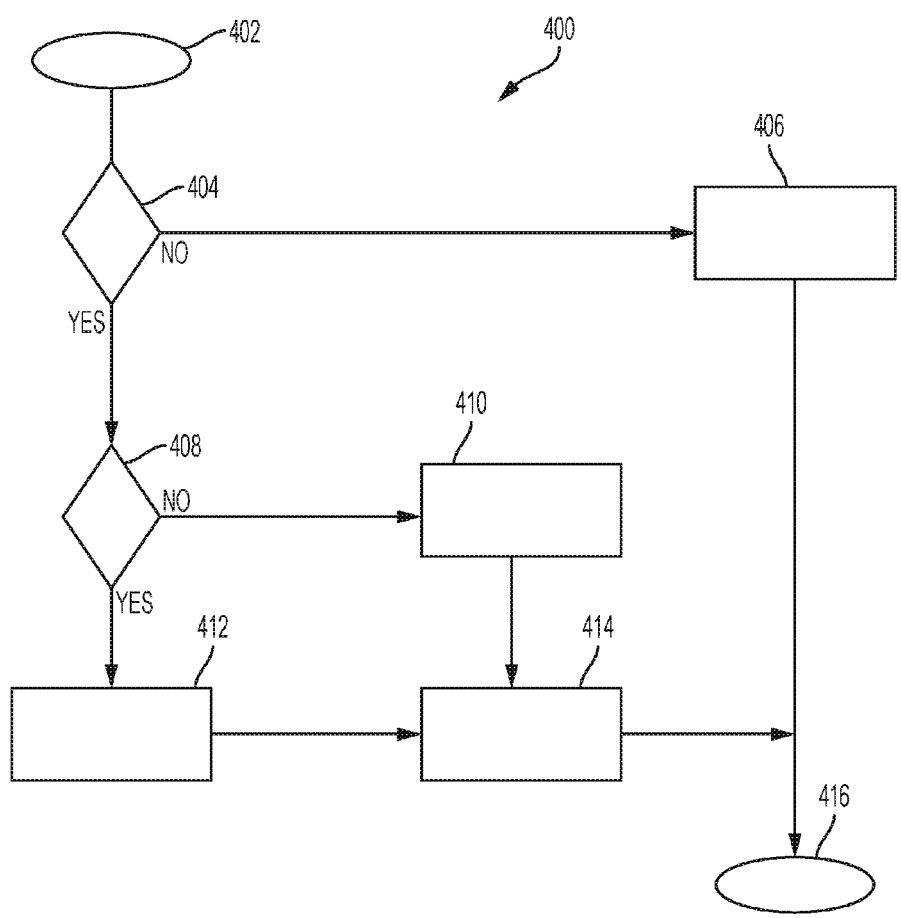
FIG. 4 is a flowchart illustrating a vehicle propulsion system control method in accordance with an exemplary embodiment of the present invention.

FIG. 4 illustrates a flowchart 400 for a vehicle propulsion system control method in accordance with an exemplary embodiment of the present invention. The method starts at step 402 and continues to step 404. In step 404, the transmission power transfer backbone 204 determines whether an upshift is occurring or not. If, in step 404, the transmission power transfer backbone 204 determines that an upshift is not occurring then the method continues to step 406. In step, 406 the engine torque backbone 202 uses the measured gear ratio MGR that is calculated from the transmission input speed sensor divided by the transmission output speed sensor to determine an input torque request based on the desired axle torque as explained above.

If, however, in step 404, the transmission power transfer backbone 204 determines that an upshift is occurring, then the method continues to step 408. In step 408, the transmission power transfer backbone 204 determines whether the transmission 106 provides a feedback signal with which to determine clutch capacity or not. If, in step 408, the transmission power transfer backbone 204 determines that the transmission 106 does not provide a clutch capacity feedback signal, then the method continues to step 410. In step 410, the transmission power transfer backbone 204 generates a torque phase ratio that follows a linear projection between the attained gear ratio at the start of the torque phase and the commanded ratio for the end of the torque phase ratio based on a percent-torque-phase-completion calculation. Specifically, the value for the torque phase ratio is determined based upon the linear projection and the amount of time within the torque phase which has elapsed to determine the specific value or point on the linear projection. The method then continues to step 414.

If, however, in step 408, the transmission power transfer backbone 204 determines that the transmission 106 does provide a clutch capacity feedback signal then the method continues to step 412. In step 412, the transmission power transfer backbone 204 the system determines the percent-torque-phase-completion based upon the clutch capacity signal. For example, if the clutch capacity signal indicates that the on-coming clutch has achieved fifty percent capacity, then the system can decide that the transmission is fifty percent of the way through the torque-phase and output a torque phase ratio value corresponding to fifty percent of the way along the linear projection between the attained gear ratio at the start of the torque phase and the commanded ratio at the end of the torque phase.

The method then continues to step 414, where the transmission power transfer backbone 204 substitutes the current torque phase ratio value in lieu of the measured gear ratio for use by the engine torque backbone 202 with which the backbone 202 generates an engine torque request 312 that results in an axle torque 304 that follows a desired axle torque profile 300.

Again, although the above-description describes a linear torque phase ratio projection, that projection may be non-linear such as when, for example, on-coming clutch capacity is detected earlier or later than expected. In general, any torque phase ratio may be generated such that a desired axle torque profile is more closely followed.

Additionally, it is to be understood that the torque phase generally starts when the on-coming element fills and ends when either the off-going element drops or when the on-coming element starts to become effective (such as may be indicated by turn down in engine speed 330). Preferably, the torque phase ends no later than when the on-coming element starts to become effective in altering the engine speed.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A vehicle comprising:
   a prime mover operable for generating an input torque on an input shaft;
   a transmission connected to the prime mover that is configured to receive the input torque from the input shaft and produce an output torque on an output shaft; and
   a controller in communication with the transmission and the prime mover, wherein the controller is programmed to:
   generate a torque phase ratio; and
   submit a torque request to the prime mover that is based upon a desired output torque divided by the torque phase ratio.

2. The vehicle of claim 1, wherein the torque phase ratio is determined based upon an attained gear ratio at the start of a torque phase and a commanded gear ratio at the end of a torque phase.

3. The vehicle of claim 2, wherein the torque phase ratio follows a linear projection between the attained gear ratio at the start of the torque phase and the commanded gear ratio at the end of the torque phase.

4. The vehicle of claim 2, wherein the torque phase starts when an on-coming clutch fills.

5. The vehicle of claim 2, wherein the torque phase ends when an on-coming clutch becomes effective to carry a desired torque.

6. The vehicle of claim 2, wherein the torque phase ends when an off-going clutch releases.

7. The vehicle of claim 1, wherein the transmission provides clutch capacity feedback and wherein the torque phase ratio is determined based upon the clutch capacity feedback.

8. The vehicle of claim 7, wherein the torque phase ratio is further determined based upon an attained gear ratio at the start of a torque phase and a commanded gear ratio at the end of a torque phase.

9. A propulsion system controller for a vehicle that includes a prime mover operable for generating an input torque on an input shaft, and a transmission connected to the prime mover that is configured to receive the input torque from the input shaft and produce an output torque on an output shaft, the controller programmed to:
   generate a torque phase ratio; and
   submit a torque request to the prime mover that is based upon a desired output torque divided by the torque phase ratio.

10. The controller of claim 9, wherein the torque phase ratio is determined based upon an attained gear ratio at the start of a torque phase and a commanded gear ratio at the end of a torque phase.

11. The controller of claim 10, wherein the torque phase ratio follows a linear projection between the attained gear ratio at the start of the torque phase and the commanded gear ratio at the end of the torque phase.

12. The controller of claim 10, wherein the torque phase starts when an on-coming clutch fills.

13. The controller of claim 10, wherein the torque phase ends when an on-coming clutch becomes effective to carry a desired torque.

14. The controller of claim 10, wherein the torque phase ends when an off-going clutch releases.

15. The controller of claim 9, wherein the transmission provides clutch capacity feedback and wherein the torque phase ratio is determined based upon the clutch capacity feedback.

16. The controller of claim 15, wherein the torque phase ratio is further determined based upon an attained gear ratio at the start of a torque phase and a commanded gear ratio at the end of a torque phase.

17. A method for controlling a propulsion system for a vehicle that includes a prime mover operable for generating an input torque on an input shaft, and a transmission connected to the prime mover that is configured to receive the input torque from the input shaft and produce an output torque on an output shaft, the method comprising:
   generating a torque phase ratio; and
   submitting a torque request to the prime mover that is based upon a desired output torque divided by the torque phase ratio.

18. The method of claim 17, wherein the torque phase ratio is generated based upon an attained gear ratio at the start of a torque phase and a commanded gear ratio at the end of a torque phase.

19. The method of claim 18, wherein the torque phase ratio follows a linear projection between the attained gear ratio at the start of the torque phase and the commanded gear ratio at the end of the torque phase.

20. The method of claim 17, wherein the transmission provides clutch capacity feedback and wherein the torque phase ratio is generated based upon the clutch capacity feedback.

* * * * *